(12) United States Patent
Rogers et al.

(10) Patent No.: US 10,275,174 B2
(45) Date of Patent: Apr. 30, 2019

(54) SYSTEM AND METHOD FOR PRE-CONDITIONING A STORAGE DEVICE

(71) Applicant: Samsung Electronics Co., Ltd., Suwon-si, Gyeonggi-do (KR)

(72) Inventors: Harry Rogers, San Jose, CA (US); Oscar Pinto, San Jose, CA (US); Yang Seok Ki, Palo Alto, CA (US)

(73) Assignee: Samsung Electronics Co., Ltd. (KR)

( * ) Notice: Subject to any disclaimer, the term of this patent is extended or adjusted under 35 U.S.C. 154(b) by 138 days.

(21) Appl. No.: 15/282,988

(22) Filed: Sep. 30, 2016

(65) Prior Publication Data

US 2018/0059983 A1  Mar. 1, 2018

Related U.S. Application Data

(60) Provisional application No. 62/378,607, filed on Aug. 23, 2016.

(51) Int. Cl.
 *G06F 3/06* (2006.01)
 *G06F 12/02* (2006.01)
 *G06F 12/14* (2006.01)

(52) U.S. Cl.
 CPC ............ *G06F 3/0638* (2013.01); *G06F 3/061* (2013.01); *G06F 3/0616* (2013.01); *G06F 3/0632* (2013.01); *G06F 3/0653* (2013.01); *G06F 3/0655* (2013.01); *G06F 3/0679* (2013.01); *G06F 3/0688* (2013.01); *G06F 12/0246* (2013.01); *G06F 12/0253* (2013.01); *G06F 12/1408* (2013.01); *G06F 2212/402* (2013.01)

(58) Field of Classification Search
 CPC ...... G06F 3/0638; G06F 3/061; G06F 3/0653; G06F 3/0655; G06F 3/0679; G06F 12/0246; G06F 12/0253; G06F 12/1408; G06F 2212/402
 See application file for complete search history.

(56) References Cited

U.S. PATENT DOCUMENTS

| | | | |
|---|---|---|---|
| 6,977,841 B2 | 12/2005 | Roohparvar | |
| 8,095,577 B1 | 1/2012 | Faibish et al. | |
| 8,239,618 B2 | 8/2012 | Kotzur et al. | |
| 8,458,417 B2 | 6/2013 | Goss et al. | |
| 8,738,882 B2 | 5/2014 | Post et al. | |
| 9,086,805 B2 | 7/2015 | Feldman et al. | |
| 9,245,622 B1 | 1/2016 | Kumar | |
| 9,342,255 B2 | 5/2016 | Jayaraman et al. | |
| 2007/0219646 A1* | 9/2007 | Oslake | G06F 3/0607 700/32 |
| 2009/0276761 A1* | 11/2009 | Saeed | G06F 11/3419 717/127 |

(Continued)

OTHER PUBLICATIONS

Cornwell, Michael. Anatomy of a Solid-state Drive. 1 Commun. ACM 55.12 (2012): pp. 59-63.

*Primary Examiner* — Nanci N Wong
(74) *Attorney, Agent, or Firm* — Innovation Counsel LLP

(57) ABSTRACT

A method includes: preconditioning a reference solid-state drive (SSD) to a steady state by writing to physical media of the reference SSD; transferring metadata of the reference SSD to an application; storing the metadata of the reference SSD in a persistent storage; normalizing the metadata of the reference SSD to a target SSD; and applying the normalized metadata to the target SSD to precondition the target SSD to the steady state.

20 Claims, 2 Drawing Sheets

(56) References Cited

U.S. PATENT DOCUMENTS

| | | | |
|---|---|---|---|
| 2011/0055397 A1* | 3/2011 | Dehaan | H04L 67/1097 709/226 |
| 2011/0307721 A1* | 12/2011 | Ouchi | G06F 3/0625 713/321 |
| 2012/0191937 A1* | 7/2012 | Feldman | G06F 12/0253 711/170 |
| 2013/0339576 A1 | 12/2013 | Liu et al. | |
| 2014/0095773 A1 | 4/2014 | Griffin et al. | |
| 2014/0351515 A1* | 11/2014 | Chiu | G06F 3/0605 711/117 |
| 2016/0026402 A1 | 1/2016 | Alcantara et al. | |
| 2016/0071612 A1* | 3/2016 | Takizawa | G11C 16/3495 365/185.11 |
| 2016/0141044 A1 | 5/2016 | Sun et al. | |
| 2017/0046097 A1* | 2/2017 | Jayaraman | G06F 3/0647 |
| 2017/0109251 A1* | 4/2017 | Das | G06F 11/3414 |
| 2017/0160986 A1* | 6/2017 | Jayaraman | G06F 3/0653 |
| 2017/0220623 A1* | 8/2017 | Blount | G06F 17/30377 |
| 2018/0024753 A1* | 1/2018 | Hallett | G06F 3/0613 711/103 |

\* cited by examiner

SYSTEM AND METHOD FOR PRE-CONDITIONING A STORAGE DEVICE

CROSS-REFERENCE TO RELATED APPLICATION(S)

This application claims the benefits of and priority to U.S. Provisional Patent Application Ser. No. 62/378,607 filed Aug. 23, 2016, the disclosure of which is incorporated herein by reference in its entirety.

TECHNICAL FIELD

The present disclosure relates generally to storage devices, more particularly, to a system and method for pre-conditioning a storage device.

BACKGROUND

Storage devices such as solid-state drives (SSDs) and hard disk drives (HDDs) create metadata to manage physical storage media on which data are stored. When erase domains are larger than write blocks, the write blocks may be re-mapped to free blocks to enable coalescing of valid blocks and harvest a space for writing new data. Such harvesting is referred to as "garbage collection." The performance of storage devices that employ such metadata structure can be heavily dependent on the availability of empty spaces on the storage media at a given time.

When erase domains of storage media become fragmented with a mix of valid and invalid data, valid data blocks in the erase domains are copied and coalesced into erase domains containing only valid data. In some cases, all blocks in some erase domains are invalidated to create a "free" erase domain for new data. While it is a time-consuming operation, it is a normal and necessary operation required for such storage devices.

A new and empty storage device does not require garbage collection to make its storage media available when a write command is received. In this case, a valid data entry is merely added to its metadata to index and point to the location of the data that is written. The performance of a storage device in a "fully-written" state may be much more representative of its true capabilities than when the storage device is in an "empty" state.

In addition, the performance of a storage device may vary at its fully-written state with the patterns of writes performed. For example, a storage device with a predominant patterns of random writes may exhibit a different performance from a storage device with predominant patterns of sequential writes. Similarly, a storage device with a predominant patterns of frequently over-written blocks may exhibit a different performance from a storage device with predominant patterns of infrequently over-written blocks. As a result, the state of the storage device may be characterized based on the number and patterns of writes being applied.

When developing software for storage devices, it is necessary to periodically check the performance of the storage device in a representative state, for example, a non-empty or nearly fully-written state. Before benchmarking the performance of a storage device, the storage device is typically pre-conditioned with a series of writes to place the storage device into a representative state. When deploying storage devices into a working environment, it is important to ensure predictable performance of the storage devices when they operate in their representative states. Therefore, it is desirable to pre-condition storage drives to their representative state before deployment.

As device capacities of storage devices increase, the pre-conditioning process takes ever-increasing amounts of time, typically many hours or even days. Therefore, it is of great value to developers and to anyone who desires to benchmark performance of their systems to shorten the pre-conditioning process of the storage devices.

The pre-conditioning processes for storage devices can significantly reduce their lifetime. Pre-conditioning typically entails writing of nearly all of the device's media at least once, and in the case of SSDs, it requires a great deal of erasing. Therefore, it is highly desirable to reduce the amount of writing and erasing of storage media required by a device pre-conditioning process.

SUMMARY

According to one embodiment, a method includes: pre-conditioning a reference solid-state drive (SSD) to a steady state by writing to physical media of the reference SSD; transferring metadata of the reference SSD to an application; storing the metadata of the reference SSD in a persistent storage; normalizing the metadata of the reference SSD to a target SSD; and applying the normalized metadata to the target SSD to precondition the target SSD to the steady state.

According to another embodiment, a method includes: preconditioning a reference solid-state drive (SSD) to a steady state by writing to physical media of the reference SSD; transferring metadata of the reference SSD to an application; normalizing the metadata of the reference SSD; and storing the metadata of the reference SSD in a persistent storage.

According to yet another embodiment, a method includes: obtaining metadata of a reference SSD; normalizing the metadata of the reference SSD to a target SSD; and applying the normalized metadata to the target SSD to precondition the target SSD to the steady state.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
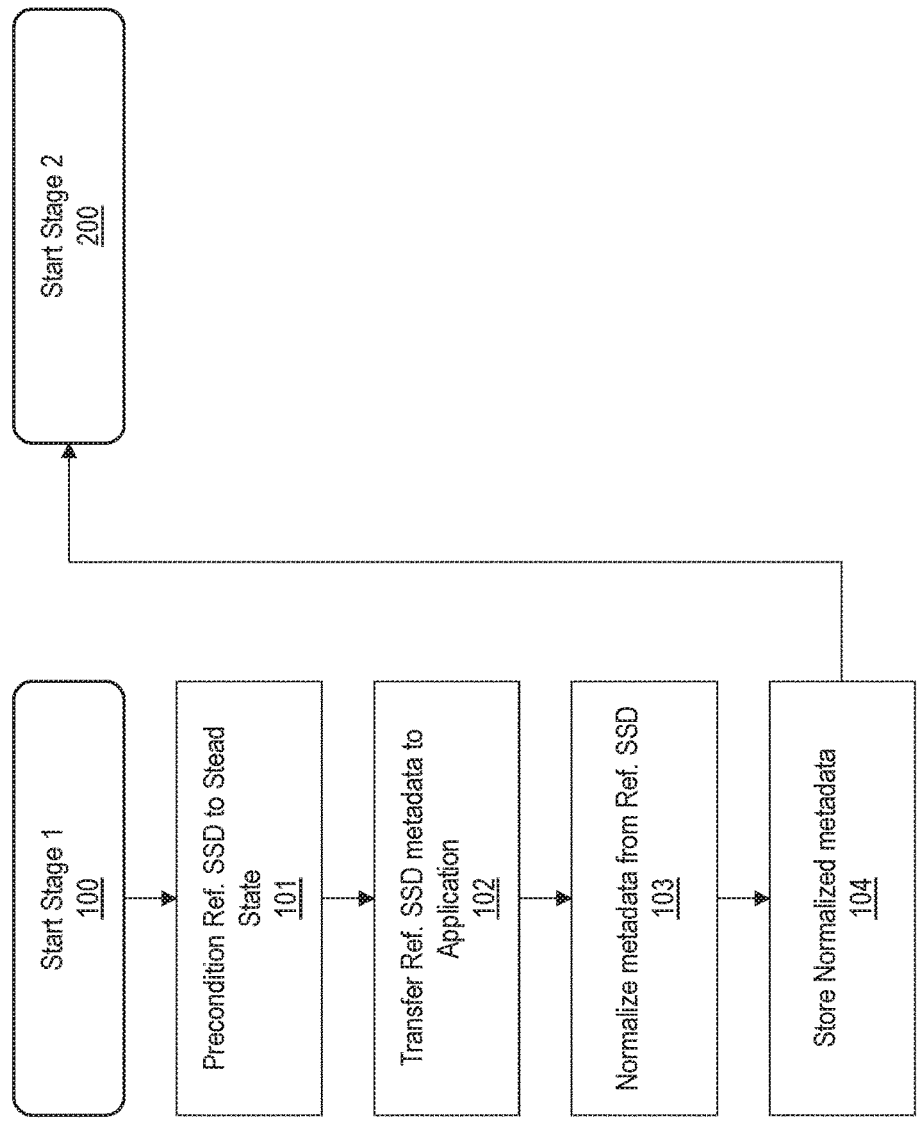
FIG. 1 shows a flowchart for an example preconditioning process of a reference SSD, according to one embodiment.

The figures may not be necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a system and method for pre-conditioning a storage device. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure describes a method for pre-conditioning a storage device. A host computer can send a command for preconditioning to the attached storage device, and the storage device acts on the command to automatically pre-condition itself according to preconditioning requirements described in the command. In addition, the present disclosure describes a method for arranging metadata is to conform to the pre-conditioning requirements, while maintaining consistency with data that is already on the storage device, or while eliminating or minimizing the requirement to write or erase data blocks on the storage device.

The present method for pre-conditioning a storage device can significantly reduce time to pre-condition a storage device by mainly manipulating device metadata and avoiding manipulation of data blocks. The present method for pre-conditioning involves preloading of metadata and a fractional writing to the physical media of a storage device to render the physical media to be consistent with the metadata. Resultantly, the present method can reduce device wear caused by conventional pre-conditioning, create a fixed and accelerated out-of-box solution for users in real-world applications and working environments, and greatly increase productivity in development and testing in the field.

An SSD drive preconditioning process can vary based on drive configurations and manufacturing process of vendors. According to one embodiment, the present method for pre-conditioning can be divided into two stages, namely Stage 1 and Stage 2.

The first stage (Stage 1) starts with an SSD in a fresh state. For example, the SSD may not have a prior history of write operations to its data blocks and ageing of data blocks. The SSD can be taken through Stage 1 to complete its own preconditioning process, and metadata of the SSD representing the states of the SSD in a steady state is created and stored. According to one embodiment, the SSD can go through Stage 1 along with additional hardware and vendor-specific application. The SSD that has completed Stage 1 can provide normalized metadata that can be used as a reference for other SSDs in the second stage (stage 2).

FIG. 1 shows a flowchart for an example preconditioning process of an SSD, according to one embodiment. Initially, the SSD is subjected to preconditioning by writing to physical media of the SSD (101). In one embodiment, a host computer can run a preconditioning application to issue a series of write commands to write to the data blocks of the SSD. In another embodiment, the preconditioning application can send a command for preconditioning to the SSD, and the SSD acts on the command to automatically pre-condition itself according to preconditioning requirements described in the command.

The preconditioning application can place the SSD in a steady state for a given workload in a target environment. For comparison, a conventional preconditioning process involves writing to the entire physical media of the SSD with a target application to be deployed, benchmarking or testing the SSD until all erase blocks have been exhausted and erased at least three times. Examples of the target applications include, but are not limited to, databases with varying mixes of get and put, or read and write traffic, file systems, log devices for databases or file systems, and caching systems for networked storage. According to some embodiments, some SSDs can self-learn and adapt to the preconditioning workload to achieve a desired steady state. The SSD can be determined to have reached a steady state based on various parameters including, but not limited to, write counts of individual blocks, erase block counts, page ageing, garbage collection ratios, spare capacity usage and other internal statistics. The SSD that has reached the steady state is referred to as a reference SSD and is ready for the next step.

Next, the internal mapping state of the reference SSD is transferred to an application (102). The application program may be a program running in the flash transfer layer (FTL) of the reference SSD. In one embodiment, the FTL application can transfer the internal mapping state (i.e., metadata) of the reference SSD of the reference SSD to a temporary staging memory (e.g., DRAM) or an internal buffer. For example, the internal mapping state of the preconditioned SSD may be copied to the internal buffer of the host computer using vendor-specific software and/or hardware. The copied metadata reflects the internal mapping state of the reference SSD in the steady state and can be later copied to an internal memory or buffer of a target SSD.

Examples of data contained in metadata of the reference SSD include, but are not limited to, logical to physical mappings, a write count of individual blocks, an erase block count, page ageing, a garbage collection ratio, a spare capacity usage and other internal statistics that can make up the state of the SSD. The internal mapping state of the reference SSD may be described by various parameters. Examples of such parameters include, but are not limited to, raw or encrypted representation of the SSD state, sequentially of written data, distribution of page age, physical media characteristics such as geometry of channels and ways and stride of channel striping, and block statistics such as free blocks, distribution of erase block, dirtiness, and a total block count. The data contained in metadata can be specific to the SSD vendor's drive architecture and/or to the flash vendor's device architecture.

In some embodiments, the metadata of the reference SSD may be represented in a vendor-specific form. The vendor-specific form may include a derivative of various data contained in the metadata in a way that the derivative form can be reconstructed back from the packaged internal mapping state. The vendor-specific form of the reference metadata may be in a secure form preventing other vendors from reverse engineering the characteristics of the reference SSD or theft of the metadata of the reference SSD. The derivative form may utilize vendor-specific programming steps and logic. In this case, the actual metadata written as a part of the preconditioning step in 101 may not be transferred to a host computer. This mechanism to initiate and transfer the SSD metadata may utilize an existing protocol interface such as a data set management (DSM) using vendor-defined operations. The SSD may also employ a mechanism where the metadata may not be transferred to the internal buffer as is and may undergo one or more levels of encryption and security policies.

Once the metadata of the reference SSD is transferred to the internal buffer of the host computer, the application running on the host computer can apply normalization techniques to prepare the copied metadata for a target SSD (103). The normalization techniques may account for various parameters of the target SSD including, but not limited to, a drive size, SSD technology, orientation, and climatic data points. The application may transfer the normalized SSD metadata to a DRAM buffer of a host computer in preparation for the next stage (Stage 2), or save the normalized SSD metadata to a persistent store (104). According to one embodiment, the application may create a library of preconditioned metadata specific to given workloads or target environments. The normalized SSD metadata saved to the persistent store can be used to precondition various target SSDs.

The reference SSD may include physical blocks arranged in channels and ways. A host computer including a multicore CPU may perform a preconditioning process for writing data to the physical blocks in parallel using multiple cores of the CPU to speed up the preconditioning process. When looking through the blocks, pages, ways, channels, each of the preconditioning process running on each cores of the host CPU can detect bad blocks. Below is an example pseudo code for a stage 1 preconditioning process. It is noted that the example pseudo code below may not be representative of any specific programming language. A typical controller of a host computer has multiple cores, and each of the multiple cores are assigned to a group of channels to manage. The detailed states of the reference SSD are parsed and its physical attributes and geometry information are stored in a table as shown in Table 1 along with other variables specific to the reference SSDs.

```
for core in num(cores):
    'loop through all cores in parallel'
    for channel in num(channels):
        'loop through all channels per core'
        for plane in num(planes):
            'loop through all ways per channel'
            for block in num(blocks):
                'update bad block map'
                if bad(block):
                    update(bad_block_map)
                    continue
                'loop through all pages in block'
                'read valid page map'
                'read attribute(block)'
                'erase count for wear levelling %'
```

TABLE 1

| Variables Collected in Stage 1 | | | |
|---|---|---|---|
| Page | Valid Data | Erase Count | ... |
| 0 | | | |
| 1 | | | |
| 2 | | | |
| ... | | | |

According to one embodiment, the erase count of individual erase blocks is used to make an optimal selection of victim blocks for garbage collection. A well-worn SSD may be used as a reference SSD for preconditioning a new target SSD by normalizing the wear data to a similar, but fresher, wear profile. The wear profile is an important factor in determining the performance of the deployed SSDs.

Referring to FIG. 1, the second stage (Stage 2) 200 can quickly bring any given target SSD (e.g., any vendor-defined SSD) to a steady state without actually going through the long iterative steps as defined by the Storage Networking Industry Association (SNIA) and SSD vendors. In Stage 2, the SSD can be brought to a steady state using the metadata obtained in Stage 1.

Figure 2:
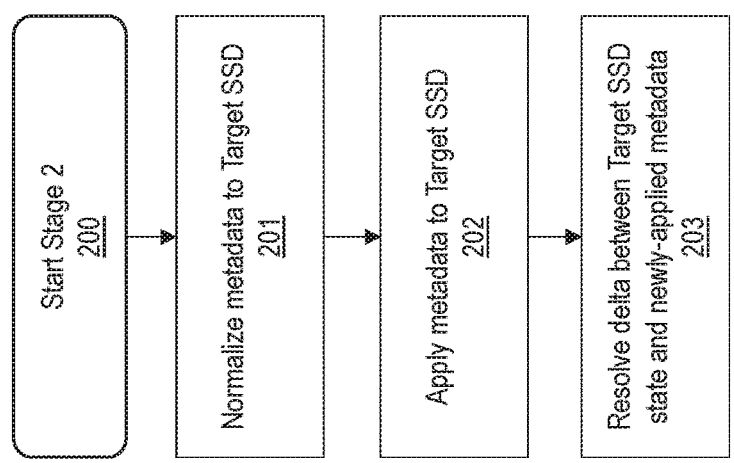
FIG. 2 shows a flowchart for an example preconditioning process of a target SSD, according to one embodiment.

FIG. 2 shows a flowchart for an example preconditioning process of a target SSD, according to one embodiment. First, the reference SSD metadata obtained in Stage 1 is normalized to a target SSD to be preconditioned (201). For example, a vendor-specific application program can fetch the reference SSD metadata to a temporary staging memory (e.g., DRAM) for normalizing the reference SSD metadata in a form appropriate for the target SSD. The vendor-specific application may be the same as the application that is used to generate the normalized reference SSD metadata in Stage 1. In other embodiments, different applications may be used to generate the normalized reference SSD metadata and to apply the reference SSD metadata to the target SSD, respectively.

In some embodiments, the reference SSD and the target SSD may be manufactured by the same vendor using the same SSD technology and may have the same or similar internal architecture. In this case, the normalized SSD metadata that is fetched to the target SSD may account for only the difference between the reference SSD and the target SSD, for example, the drive size of the SSD. In other embodiments, the reference SSD and the target SSD may be manufactured by different vendors using different SSD technology or different internal architecture. In this case, the normalized SSD metadata that is fetched to the target SSD may account for the difference between the reference SSD and the target SSD such as the drive size, SSD technology, and other unique characteristics specific to the reference SSD and the target SSD. The SSD-specific characteristics that are unique to the reference SSD may have been already normalized in Stage 1 such that the normalized SSD metadata is applicable to any SSD having a different drive size, manufactured with different SSD technology, orientation, climatic data points, etc.

The application applies the normalized metadata obtained in step 201 to the target SSD (202). For example, the application transfers the reference SSD metadata to the target SSD using vendor-defined logic, DSM or some other mechanism. The application may further resolve the difference between the existing state of the target SSD and newly-applied metadata (203). For example, the target SSD is measured to quantify the difference (delta) between the normalized metadata and actual state of physical media of the target SSD.

In some embodiments, the target SSD may be fresh from the factory and nearly the same as the reference SSD. In other embodiments, the target SSD may be the next-generation of the reference SSD, or have a different capacity (e.g., 2 times) compared to the reference SSD. The difference (delta) between the reference SSD and the target SSD may be measured to have a quantitative ratio and difference to apply to relevant physical parameters during normalization. For example, when the target SSD has a double capacity of the reference SSD, the metadata for each erase block state in the reference SSD may be replicated to have twice as many such erase blocks in the target SSD.

As a result of the metadata transfer and application, the target SSD changes its state from its existing state to the steady state. The last existing state of the target SSD may be saved on a persistent storage before applying the metadata. The last existing state of the target SSD may be referred to in its age tracking and garbage collection mechanisms.

The application may repeat the steps 201-203 to precondition another target SSDs. The preconditioning of a large batch of target SSD is particularly useful for large array deployment, where a new system setup needs to prepare many fresh SSDs for their first use. The stored reference and normalized SSD metadata obtained in Stage 1 can be used to precondition many target SSDs eliminating a need to actually go through the time consuming preconditioning process.

Below is an example pseudo code for a stage 2 preconditioning process. It is noted that the example pseudo code below may not be representative of any specific programming language. The physical attributes and geometry information of the target SSD is obtained. If the attributes of the reference SSD and the target SSD are identical, the dataset obtained in Stage 1 is applied. If not, it is determined whether the reference SSD and the target SSD are compatible. If they are compatible, the variables collected in Table 1 are normalized to reflect the differences in good block counts. Missing numbers of the block counts in Table 1 may be filled in with random numbers if the target SSD has more block counts due to the capacity increase with respect to the reference SSD. If the reference SSD and the target SSD are not compatible, the operation is aborted.

```
for core in num(cores):
    'loop through all cores in parallel'
    for channel in num(channels):
        'loop through all channels per core'
        for plane in num(planes):
            'loop through all ways per channel'
            for block in num(blocks):
                'update bad block map'
                if bad(block):
                    update(bad_block_map)
                    continue
                'loop through all pages in block'
                'update valid page map'
                'update attribute(block)'
                'update count for wear levelling %'
```

By default, an SSD is not in a preconditioned state. A preconditioning application can quickly bring the SSD to a preconditioned state using a reference metadata without undergoing the time-consuming preconditioning process and causing premature aging of the physical media of the SSD. Developers and testers can significantly reduce the time for preparing SSDs for deployment according to the present method of preconditioning. The preconditioning application can create a library of metadata data for a variety of workloads or target environments that can be applied to target SSDs as needed.

[According to one embodiment, a method includes: preconditioning a reference solid-state drive (SSD) to a steady state by writing to physical media of the reference SSD; transferring metadata of the reference SSD to an application; storing the metadata of the reference SSD in a persistent storage; normalizing the metadata of the reference SSD to a target SSD; and applying the normalized metadata to the target SSD to precondition the target SSD to the steady state.

The reference SSD may be determined to have reached the steady state based on one or more of: write counts of individual blocks, an erase block count, page ageing, a garbage collection ratio, a spare capacity usage, and internal statistics.

The application may be a flash transfer layer (FTL) of the reference SSD or a host application running on a host computer.

The metadata of the reference SSD may include one or more of raw or encrypted representation of the SSD state, sequentially of written data, distribution of page age, physical media characteristics including channels and ways and stride of channel striping, and block statistics including free blocks, distribution of erase block, dirtiness, and a total block count.

The metadata of the reference SSD may be in a vendor-specific form.

The method may further include: creating a library of metadata for one or more workloads and target environments for a plurality of reference SSDs.

The method may further include: resolving differences between the target SSD and the metadata applied to the target SSD.

The method may further include: transferring the metadata of the reference SSD to the target SSD using vendor-specific logic or data set management (DSM).

The method may further include: storing last existing metadata of the target SSD prior to applying the normalized metadata to the target SSD.

The last existing metadata of the target SSD may be used for age tracking and garbage collection.

According to another embodiment, a method includes: preconditioning a reference solid-state drive (SSD) to a steady state by writing to physical media of the reference SSD; transferring metadata of the reference SSD to an application; normalizing the metadata of the reference SSD; and storing the metadata of the reference SSD in a persistent storage.

The reference SSD may be determined to have reached the steady state based on one or more of: write counts of individual blocks, an erase block count, page ageing, a garbage collection ratio, a spare capacity usage, and internal statistics.

The application may be a flash transfer layer (FTL) of the reference SSD or a host application running on a host computer.

The metadata of the reference SSD may include one or more of raw or encrypted representation of the SSD state, sequentially of written data, distribution of page age, physical media characteristics including channels and ways and stride of channel striping, and block statistics including free blocks, distribution of erase block, dirtiness, and a total block count.

The metadata of the reference SSD may be in a vendor-specific form.

The method may further include: creating a library of metadata for one or more workloads and target environments for a plurality of reference SSDs.

According to yet another embodiment, a method includes: obtaining metadata of a reference SSD; normalizing the metadata of the reference SSD to a target SSD; and applying the normalized metadata to the target SSD to precondition the target SSD to the steady state.

The method may further include: resolving differences between the target SSD and the metadata applied to the target SSD.

The method may further include: transferring the metadata of the reference SSD to the target SSD using vendor-specific logic or data set management (DSM).

The method may further include: storing last existing metadata of the target SSD prior to applying the normalized metadata to the target SSD for age tracking and garbage collection.]

The above example embodiments have been described hereinabove to illustrate various embodiments of implementing a system and method for providing a system and method for pre-conditioning a storage device. Various modifications and departures from the disclosed example embodiments will occur to those having ordinary skill in the art. The subject matter that is intended to be within the scope of the invention is set forth in the following claims.

What is claimed is:

1. A method comprising:
preconditioning a reference solid-state drive (SSD) to a steady state by writing data corresponding to a workload that is specific to a set of one or more target applications to physical media of the reference SSD;
transferring metadata of the reference SSD to an application, wherein the metadata of the reference SSD reflects an internal mapping state of the reference SSD corresponding to the steady state as a result of writing the data corresponding to the workload that is specific to the set of one or more target applications to the physical media of the reference SSD;
storing the metadata of the reference SSD in a persistent storage;
normalizing the metadata of the reference SSD by changing a drive size and a wear profile of the reference SSD to a normalized drive size and a normalized wear profile corresponding to a target SSD; and
preconditioning the target SSD by applying the normalized metadata to the target SSD and thereby changing an internal mapping state of the target SSD to the steady state corresponding to the set of one or more target applications.

2. The method of claim 1, wherein the reference SSD is determined to have reached the steady state based on one or more of: write counts of individual blocks, an erase block count, page ageing, a garbage collection ratio, a spare capacity usage, and internal statistics.

3. The method of claim 1, wherein the application is a flash transfer layer (FTL) of the reference SSD or a host application running on a host computer.

4. The method of claim 1, wherein the metadata of the reference SSD includes sequentiality of written data and one or more of raw or encrypted representation of the SSD state, distribution of page age, physical media characteristics including channels and ways and stride of channel striping, and block statistics including free blocks, distribution of erase block, dirtiness, and a total block count.

5. The method of claim 1, wherein the metadata of the reference SSD is in a vendor-specific form.

6. The method of claim 1, further comprising creating a library of metadata for one or more workloads and target environments for a plurality of reference SSDs.

7. The method of claim 1, further comprising resolving differences between the target SSD and the metadata applied to the target SSD.

8. The method of claim 1, further comprising transferring the metadata of the reference SSD to the target SSD using vendor-specific logic or data set management (DSM).

9. The method of claim 1, further comprising storing last existing metadata of the target SSD prior to applying the normalized metadata to the target SSD.

10. The method of claim 9, wherein the last existing metadata of the target SSD is used for age tracking and garbage collection.

11. A method comprising:
preconditioning a reference solid-state drive (SSD) to a steady state by writing data corresponding to a workload that is specific to a set of one or more target applications to physical media of the reference SSD;
transferring metadata of the reference SSD to an application, wherein the metadata of the reference SSD reflects an internal mapping state of the reference SSD corresponding to the steady state as a result of writing the data corresponding to the workload that is specific to the set of one or more target applications to the physical media of the reference SSD;
normalizing the metadata of the reference SSD by changing a drive size and a wear profile of the reference SSD to a normalized drive size and a normalized wear profile corresponding to a target SSD; and
storing the metadata of the reference SSD in a persistent storage,
wherein the normalized metadata is configured to be applied to the target SSD having an internal mapping state that is different from the internal mapping state of the reference SSD and precondition the target SSD by changing the internal mapping state of the target SSD.

12. The method of claim 11, wherein the reference SSD is determined to have reached the steady state based on one or more of: write counts of individual blocks, an erase block count, page ageing, a garbage collection ratio, a spare capacity usage, and internal statistics.

13. The method of claim 11, wherein the application is a flash transfer layer (FTL) of the reference SSD or a host application running on a host computer.

14. The method of claim 11, wherein the metadata of the reference SSD includes sequentiality of written data and one or more of raw or encrypted representation of the SSD state, distribution of page age, physical media characteristics including channels and ways and stride of channel striping, and block statistics including free blocks, distribution of erase block, dirtiness, and a total block count.

15. The method of claim 11, wherein the metadata of the reference SSD is in a vendor-specific form.

16. The method of claim 11, further comprising creating a library of metadata for one or more workloads and target environments for a plurality of reference SSDs.

17. A method comprising:
obtaining metadata of a reference SSD, wherein the metadata of the reference SSD reflects an internal mapping state of the reference SSD corresponding to a steady state as a result of writing data corresponding to a workload that is specific to a set of one or more target applications to physical media of the reference SSD;
normalizing the metadata of the reference SSD by changing a drive size and a wear profile of the reference SSD to a normalized drive size and a normalized wear profile corresponding to a target SSD; and
preconditioning the target SSD by applying the normalized metadata to the target SSD and thereby changing an internal mapping state of the target SSD to the steady state corresponding to the set of one or more target applications.

18. The method of claim 17, further comprising resolving differences between the target SSD and the metadata applied to the target SSD.

19. The method of claim 17, further comprising transferring the metadata of the reference SSD to the target SSD using vendor-specific logic or data set management (DSM).

20. The method of claim 17, further comprising storing last existing metadata of the target SSD prior to applying the normalized metadata to the target SSD for age tracking and garbage collection.

* * * * *